United States Patent
Minegishi et al.

(10) Patent No.: US 6,598,575 B2
(45) Date of Patent: Jul. 29, 2003

(54) AIR INTAKE APPARATUS FOR AN INTERNAL COMBUSTION ENGINE

(75) Inventors: Teruhiko Minegishi, Hitachinaka (JP); Hiroyuki Nemoto, Naka-gun (JP); Mitunori Nishimura, Hitachinaka (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 0 days.

(21) Appl. No.: 10/091,471

(22) Filed: Mar. 7, 2002

(65) Prior Publication Data

US 2002/0088423 A1 Jul. 11, 2002

Related U.S. Application Data

(62) Division of application No. 09/254,857, filed as application No. PCT/JP96/02629 on Sep. 13, 1996.

(51) Int. Cl.$^7$ ............................................. F02M 35/10
(52) U.S. Cl. ................................................. 123/184.55
(58) Field of Search ........................ 123/184.61, 184.55, 123/184.53, 336, 337, 184.57; 251/305

(56) References Cited

U.S. PATENT DOCUMENTS

| | | | | |
|---|---|---|---|---|
| 4,619,226 A | * | 10/1986 | Ueda et al. ............ | 123/184.55 |
| 4,622,931 A | * | 11/1986 | Wickramasuriya ....... | 123/190.2 |
| 4,679,531 A | * | 7/1987 | Hitomi et al. ......... | 123/184.42 |
| 5,603,296 A | * | 2/1997 | Park ................... | 123/184.55 |
| 5,813,380 A | * | 9/1998 | Takahashi et al. ...... | 123/184.55 |
| 5,875,758 A | * | 3/1999 | Fujita ................. | 123/184.61 |
| 6,443,114 B2 | * | 9/2002 | Minegishi et al. ...... | 123/184.61 |

FOREIGN PATENT DOCUMENTS

| | | | | |
|---|---|---|---|---|
| EP | 182223 | * | 5/1986 | ............ 123/184.55 |
| EP | 000182223 A2 | * | 5/1986 | ............ 123/184.55 |
| JP | 60-224924 | | 11/1985 | |
| JP | 60241580 A | * | 11/1985 | |
| JP | 60-241580 | * | 11/1985 | |
| JP | 61-57284 | * | 4/1986 | |
| JP | 6-42356 | * | 2/1994 | |
| JP | 6-81719 | | 3/1994 | |
| JP | 6-81735 | | 3/1994 | |
| JP | 8-170536 | | 7/1996 | |

* cited by examiner

Primary Examiner—Henry C. Yuen
Assistant Examiner—Hyder Ali
(74) Attorney, Agent, or Firm—Crowell & Moring LLP

(57) ABSTRACT

A structure in which an input shaft which is a member for connecting a cylindrical switching valve and a rotary mechanism, and the cylindrical switching valve are brought into contact with each other via a ball-like member. When this structure is employed, the ball-like member serves as a kind of ball joint, so that rotation can be smoothly transmitted even when there is an angle of inclination between the direction of the axis of rotation of the input shaft by which the rotary mechanism for rotating the cylindrical switching valve and the cylindrical switching valve are connected, and the direction of the axis of rotation of this switching valve.

2 Claims, 12 Drawing Sheets

AIR INTAKE APPARATUS FOR AN INTERNAL COMBUSTION ENGINE

This application is a divisional of application Ser. No. 09/254,857, filed Mar. 15, 1999, which is a 371 of PCT/JP96/02629, filed Sep. 13, 1996.

TECHNICAL FIELD

The present invention relates to an air intake apparatus for an internal combustion engine, and particularly to an air intake apparatus in which a magnetic inertia effect is employed.

BACKGROUND ART

The above-mentioned art is disclosed, for example, in Japanese Patent Application Laid-Open No. 60-224924, Japanese Patent Application Laid-Open No. 6-81719, Japanese Patent Application Laid-Open No. 6-81735, and Japanese Patent Application Laid-Open No. 8-170536.

In the apparatus shown in FIG. 2 of the Japanese Patent Application Laid-Open No. 60-224924, an output torque of the internal combustion engine is increased using the magnetic inertia effect, because the position of an opening to an intake pipe is changed by rotating an approximately cylindrical surge tank and the length of the intake pipe is thus changed.

In the apparatus shown in FIG. 33 of the Japanese Patent Application Laid-Open No. 6-81719 or FIG. 3 of the Japanese Patent Application Laid-Open No. 6-81735, an output torque of the internal combustion engine when rotated in a low speed is increased by providing a to increase the length of an intake pipe by closing a switching valve provided in the middle of the intake pipe when the internal combustion engine rotates at a low speed.

In the apparatus described in the Japanese Patent Application Laid-Open No. 8-170536, two intake pipes of which the length are different from each other are employed and a cylindrical blocking mechanism is provided in the middle of the shorter intake pipe. An output torque of the internal combustion engine is increased by using both of short and long intake pipes to increase the sectional area of a flow passage or by using only the long intake pipe In the above-mentioned prior art, the length of the intake pipe or the sectional area of its flow passage is changed in order to increase the output torque by using the inertia effect of the intake air to the internal combustion engine. Further, a butterfly valve or a cylindrical switching valve is used to change them.

The apparatus in which the butterfly valve is used has a valve body and a an axis of rotation. These members are made separately and screwed to each other. The axis of rotation is an elongated and rod-shaped member to which a plurality of butterfly valves are fixed. Further, a bearing is provided not only at both ends of the axis of rotation but between the butterfly valves so that the rotation may be not prevent due to the deflection. Because it is necessary to divide the intake pipe into two to install the valve body with such structure and the bearing in the middle of the intake pipe, there is a fear that the dimensional accuracy in assembly is deteriorated.

While, the apparatus in which the cylindrical switching valve is used has an opening penetrating in a radial direction. A valve is formed from the opening and members other than it. An intake air passing through the opening is interrupted by the rotation of the opening. Because the whole periphery of the cylinder forms an axis of rotation in this mechanism, the change in the shape due to deflection is less than that in a butterfly valve. Further, because the axis and the valve can be fabricated in one, there is an advantage that it is easy to fabricate. Further, by using an assembling method in which a hole through which a cylindrical switching valve is inserted in a axial direction is fabricated integrally in a part of the intake pipe of the air intake apparatus, and the cylindrical switching valve is inserted into the hole, it become unnecessary to divide the intake pipe into two as in the case of the butterfly valve. It is, therefore, possible to prevent the deterioration of the dimensional accuracy in a radial direction when assembled.

However, as compared with the apparatus in which the axis of rotation is made of an elongated and rod-like axis member as in the case that the butterfly valve is used, it is necessary to improve a method for fixing in a radial direction in the case that the cylindrical switching valve is used. In the apparatus disclosed in the above-mentioned Japanese Patent Application Laid-Open No. 8-170536, one end of the cylindrical switching valve causes to be contacted on an aperture provided at the bottom of the hole, and it is biased in an axial direction with a spring not so as to it departs from the aperture.

In the above prior art, the relationship between the direction of the axis of rotation of a connection member by which the rotary mechanism for rotating the cylindrical switching valve and the cylindrical switching valve are connected, and the direction of the axis of rotation of the cylindrical switching valve, is not out of consideration. Accordingly, there was possibility that the rotation is not smoothly transmitted when there is displacement or inclination between them.

DISCLOSURE OF INVENTION

The present invention can provide an air intake apparatus which can solve the problems which can not be solved in the prior art. Namely, in the present invention, an input shaft which is a member for connecting a cylindrical switching valve and a rotary mechanism together, and the cylindrical switching valve, are brought into contact with each other via a ball-like member. In the above structure, the ball-like member serves as a kind of ball joint, so that rotation can be smoothly transmitted even when there is an angle of inclination between the direction of the axis of rotation of the input shaft by which the rotary mechanism for rotating the cylindrical switching valve and the cylindrical switching valve are connected, and the direction of the axis of rotation of this switching valve.

BEST MODE FOR CARRYING OUT THE INVENTION

Embodiments of the present invention will be explained hereinafter.

While the present embodiment explains an example of a spark ignition type internal combustion engine which use fuel such as gasoline, it should be noted that the present invention may be applied to another type engine such as a self-ignition type engine.

Figure 1:
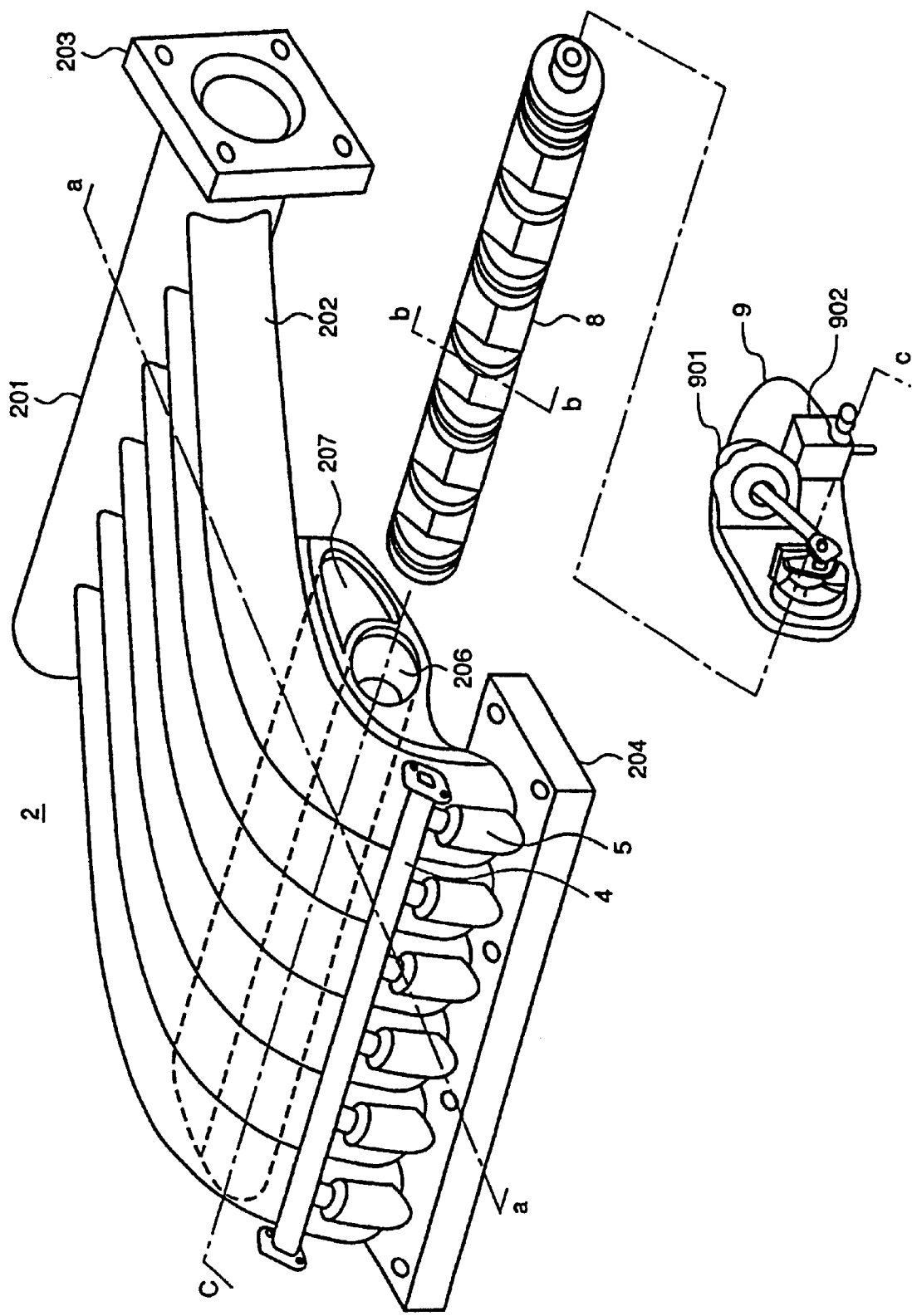
FIG. 1 is a perspective view of an air intake apparatus for guiding an intake air supplied to an internal combustion engine.
Figure 2:
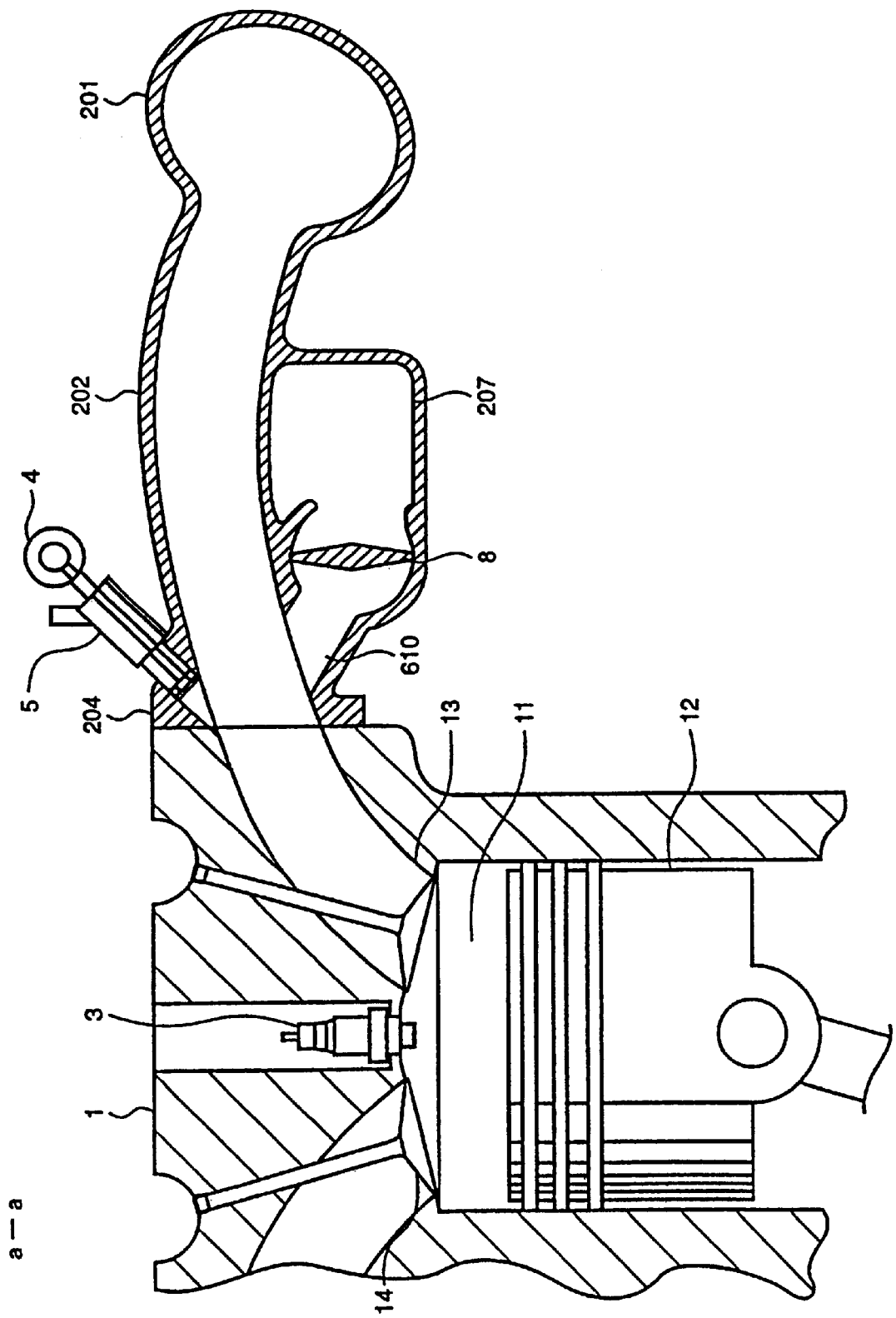
FIG. 2 is a sectional view taken along a line a—a of FIG. 1.
Figure 3:
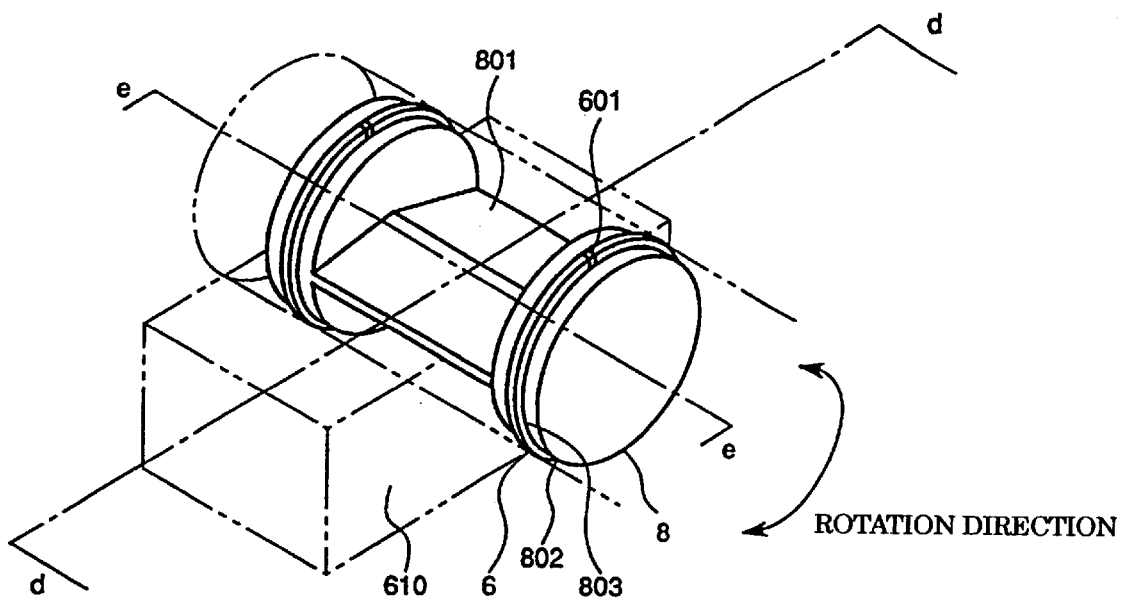
FIG. 3 is a perspective view of a part of a switching valve 8.

Referring to FIG. 2 and FIG. 3, the structure of an air intake apparatus for an internal combustion engine will be explained. FIG. 1 is a perspective view of an air intake apparatus for guiding an intake air supplied to an internal combustion engine, and FIG. 2 is a sectional view taken along a line a—a of FIG. 1.

In FIG. 1, the air intake apparatus mainly includes an intake pipe 2 to guide the intake air to the internal combustion engine.

An injector 5 is provided to the intake pipe 2 to supply fuel to a combustion chamber 11 of a cylinder of the internal combustion engine shown in FIG. 2. A fuel pipe 4 is provided to the injector 5 to supply the fuel.

The intake pipe 2 comprises a collector 201 having one chamber, a branch 202 having air intake passages of the same number as cylinders of the internal combustion engine, a flange 203 to be connected to a throttle switching valve (not shown) for adjusting an amount of intake air, and a flange 204 to be connected to an internal combustion engine block 1 shown in FIG. 2. These components are fabricated or assembled in one.

To the branch 202, a valve holder 206 and a common volume 207 are further provided. The common volume 207 is a chamber having one space extended in a direction perpendicular to the plural branches 202. The common volume 207 has openings of the same number as the branches 202, each connected fluidly to the valve holder 206 corresponding to the branch 202. The valve holder is a hole-like chamber into which a switching valve 8 is inserted, and has one space extending in a direction perpendicular to the plural branches 202.

The switching valve 8 is inserted into a hole of the valve holder 206 and assembled so as to open and close the passages between the common volume 207 and the branches 202.

A negative pressure module 9 including a differential pressure actuator 901 and an electromagnetic valve 902 is connected to one end of the switching valve 8. The switching valve 8 is driven by the negative pressure module 9. The drive mechanism such as a diaphragm actuator using the difference of pressure between the atmospheric pressure and the negative pressure generated in the intake pipe during operation of the internal combustion engine, is widely used. The negative pressure module has the above-mentioned principle and comprises the differential pressure actuator 901 for converting a differential pressure into movement and the electromagnetic valve 902 for interrupting the pressure to the differential pressure actuator 901. It performs open/close of the switching valve 8, that is, on/off control.

The above-mentioned components and parts are assembled integrally and fixed to the internal combustion engine as is. Thereby, it becomes easy to assemble as compared with the case that their parts are installed in the internal combustion engine one by one. As a result, the assembly time can be shorten.

In a plurality of combustion chambers 11 of the internal combustion engine block 1 shown in FIG. 2, air-fuel mixture is burned. The expansion pressure generated forces a piston down to produce power. An ignition plug 3 ignite the air-fuel mixture with spark, an air intake valve 13 introduces the intake air to the combustion chamber, and an exhaust valve 14 emit a gas after combustion, The intake air branches from a collector 201 to plural branches 202, and then introduced to the combustion chamber 11 of the internal combustion engine. The chamber of the common volume 207 is connected fluidly to the inside of the branches 202 via the switching valve 8 and the inside of the sub-branches 610 of the same number as the branches 202.

The valve holder 206 is molded integrally with the branches 202 and the sub-branches 610. It is made of the material possible to maintain the rigidity in order to keep the strength. For example, it is made of metal such as steel or light metal alloy, or material including impact modifier in the case that resin material is used.

Because the switching valve 8 has the form possible to mold integrally, it is possible to make by casting or forging of light metal alloy, etc.

Effects due to open or close of the switching valve 8 will be explained next.

In the case that the engine speed of the internal combustion engine is low, the switching valve is set to be at a close position. In this position, the intake air is introduced into the internal combustion engine via a chamber of the longer branch 202. When the intake air flows via the longer passage, the intake air has a resonance point at a low frequency, from a view of acoustic theory. Accordingly, such an intake pipe is suitable at a low engine speed of the internal combustion engine.

While, in the case that the engine speed of the internal combustion engine is high, the switching valve is set to be at an open position. Because in this position it is connected spatially to another branch 202 in the middle of the branch 202, it is possible to obtain the inertia effect at an engine speed corresponding to the resonance frequency of the pipeline having the length of the shorter sub-branch plus the switching valve. Accordingly, such an intake pipe is suitable at a high engine speed of the internal combustion engine.

Next, the structure of the switching valve 8 will be explained. FIG. 3 is a perspective view of a part of a switching valve 8.

The switching valve 8 is arranged so as to intersect the direction of path of the sub-branch 610.

The major components of the switching valve 8 are a valve body 801 and an axis 802. The valve body 801 has a plate-like shape. The axis 802 has the shape different from one of a butterfly valve, and it has a disk-like shape or solid round-bar-like shape, of which the diameter is substantially the same as the axis 801. Since the forms of the valve body 801 and the axis 802 are simple, it is easy to fabricate in one. For example, it may be possible to fabricate by molding of plastics, or by casting or forging of light metal alloy such as aluminium alloy, etc. It is needless to say that different materials may be used for the valve body 801 and the axis 802. A groove 803 is formed on the circumference of the axis 802, and a seal ring 6 is fitted in the groove 803. This seal ring 6 is fitted freely in a rotation direction of the switching valve 8. The material of the seal ring 6 can be set in view of a sliding characteristic.

Figure 4:
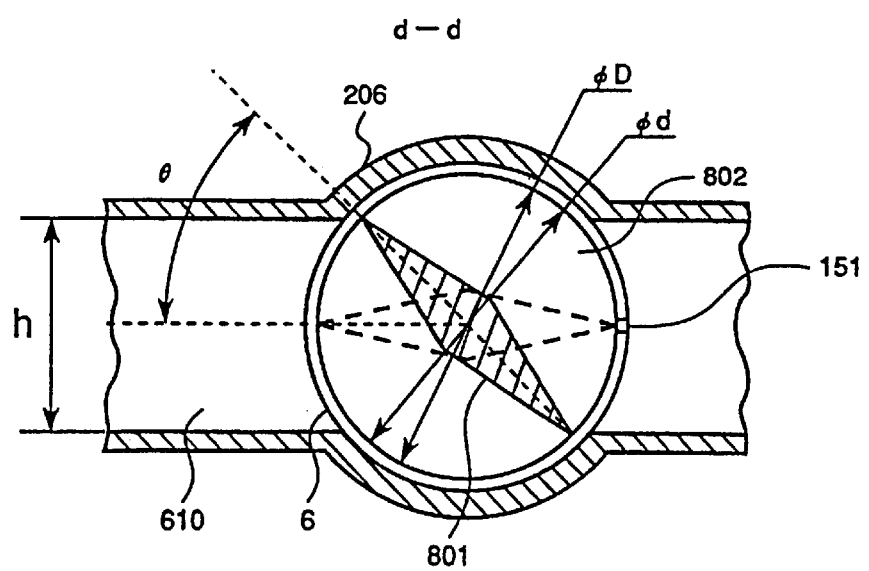
FIG. 4 is a sectional view taken along a line d—d of FIG. 3.

FIG. 4 is a sectional view taken along a line d—d of FIG. 3.

The outer diameter ød of the axis 802 is set to be smaller than the inner diameter øD of the valve holder 206, which is set to be larger than the height h of the inside passage of the sub-branch 610. The operating angle is indicated by θ as shown in the figure. It is seen that it is not required to rotate by 90 degrees.

Further, in the case that the divided portion 601 is provided in the seal ring 6 in order to attach the seal ring 6 to the groove 803 of the switching valve 8, the effect of the leakage of the intake air can be lessen when the position of the divided portion 601 is provided on the side of common volume 207 as shown in FIG. 4.

The relationship of the size of the engaging portion of the groove 803 of the switching valve 8 and the seal ring 6 will be explained next.

Figure 5:
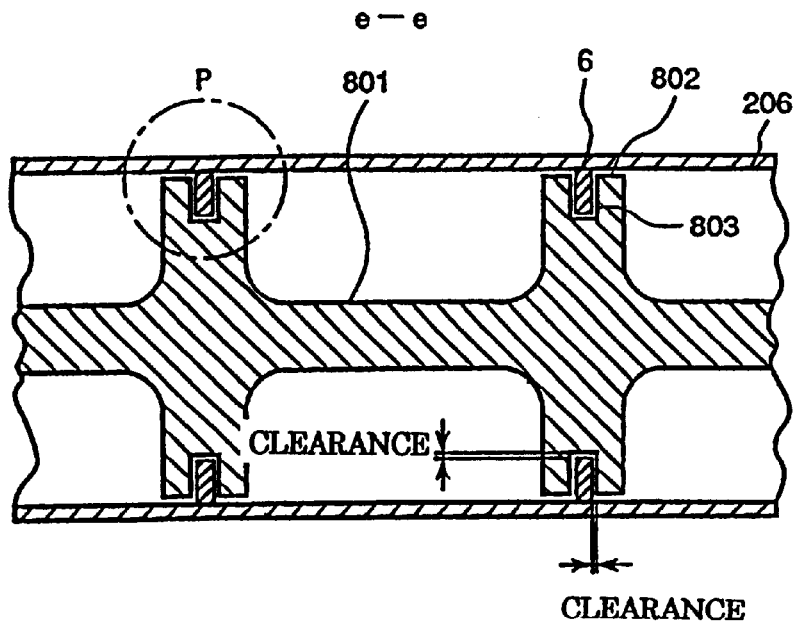
FIG. 5 is a sectional view taken along a line e—e of FIG. 3.
Figure 6:
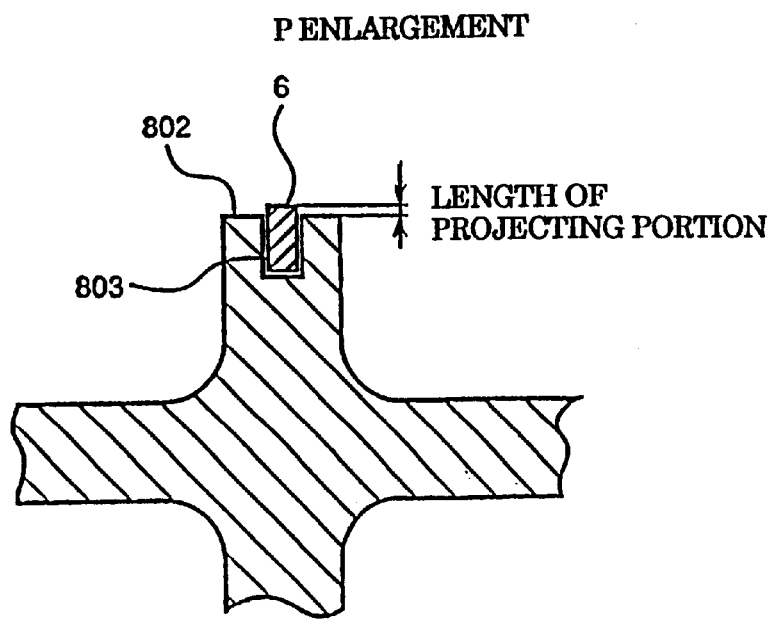
FIG. 6 is a enlarged view of a P portion shown in FIG. 5.

FIG. 5 is a sectional view taken along a line e—e of FIG. 3, and FIG. 6 is a enlarged view of a P portion shown in FIG. 5.

The thickness of the seal ring 6 is set to be smaller than the width of the groove 803, in order to maintain the clearance in an axial direction of the switching valve 8. As shown in FIG. 6, the outer diameter of the valve holder 206 in a free state in which it is not yet inserted into the valve holder 206 is set to be larger than its inner diameter so that the seal ring may not change in shape. The length of the projecting portion of the seal ring 206 is set so that it always projects from the outer diameter of the axis 802. Further, the inner diameter of the valve holder 206 in a state in which it is inserted into the valve holder 206 is set to be larger than the outer diameter of the groove 803 of the switching valve 8 to obtain the clearance in a radial direction. When the above-mentioned assembly of the switching valve 8 and the seal ring 6 is inserted into the valve holder 206, the seal ring 6 is pressed on the inner surface and fixed. Therefore, it becomes impossible to rotate freely. Since there is the clearance between the seal ring 6 and the groove 803 of the switching valve 8, the switching valve 8 can rotate freely.

Further, the gap in the axial direction of the switching valve 8 is curved in the radial direction at a position of the groove 803, that is, it has a labyrinth structure for the flow of intake air. It is, therefore, possible to minimize the leakage of the intake air in the axial direction.

Figure 7:
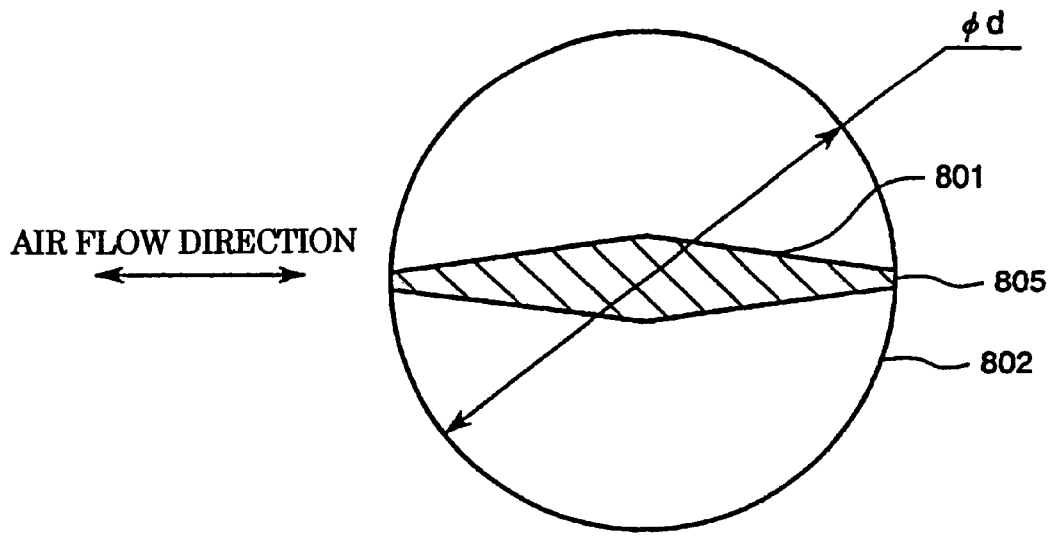
FIG. 7 is a sectional view of a valve body 801.

FIG. 7 is a sectional view of a valve body 801 of the switching valve 8, and shows the d—d section of FIG. 3 as shown in FIG. 4.

An end portion 805 of the valve body 801 touches internally the circle of the axis 802 with the outer diameter ød. The valve body 801 has a lozenge-like shape of which the thickness increase linearly as it approaches from the end portion 805 to the center. Unlike a flat plate with fixed thickness, Such shape ensures deformation-resisting strength. Further, it is also possible to avoid the sudden increase of resistance.

Figure 8:
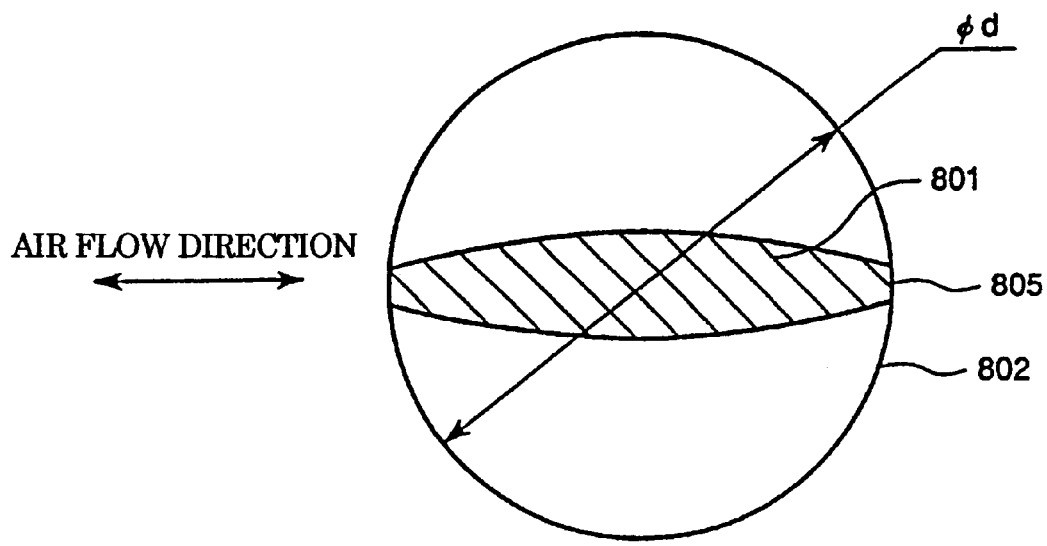
FIG. 8 is a sectional view of a valve body 801.

FIG. 8 shows another example of a sectional view of the valve body 801 of the switching valve 8.

The sectional form of the valve body 801 has a spindle-like shape of which the thickness increase with bending as it approaches from the end portion 805 to the center. The same effects as FIG. 7 is obtained by using such sectional form.

Figure 9:
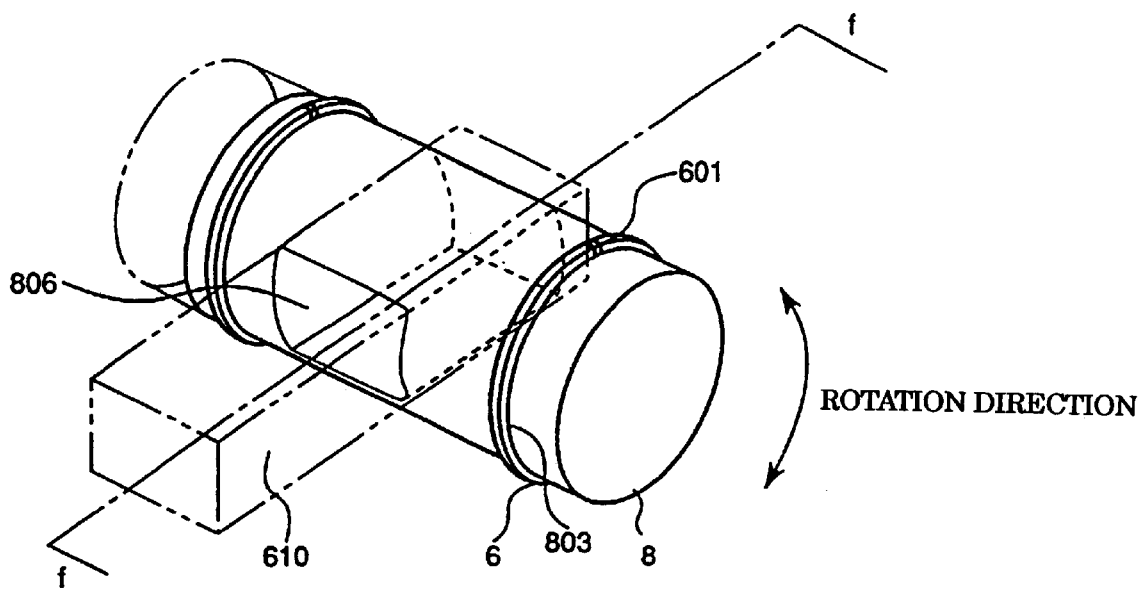
FIG. 9 is a perspective view of a part of the switching valve 8.
Figure 10:
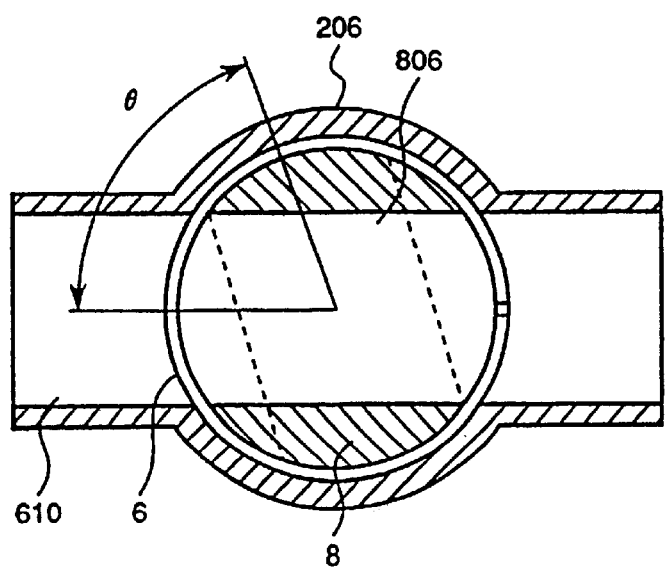
FIG. 10 is a sectional view taken along a line f—f of FIG. 9.

FIG. 9 shows another example of the switching valve 8, and is a perspective view of a part of the switching valve 8. FIG. 10 is a sectional view taken along a line f—f of FIG. 9.

The air intake passage is obtained by forming a passage 806 of which the sectional form is substantially the same as the sub-branch 610 inside of the switching valve 8. The opening and closing of the passage 806 is performed by rotating the whole switching valve 8 by operating angle θ, as shown in FIG. 10. Because in the case of closing operation the sub-branch 610 is just blocked to the passage 806, the operating angle θ may be smaller than 90 degrees.

Figure 11:
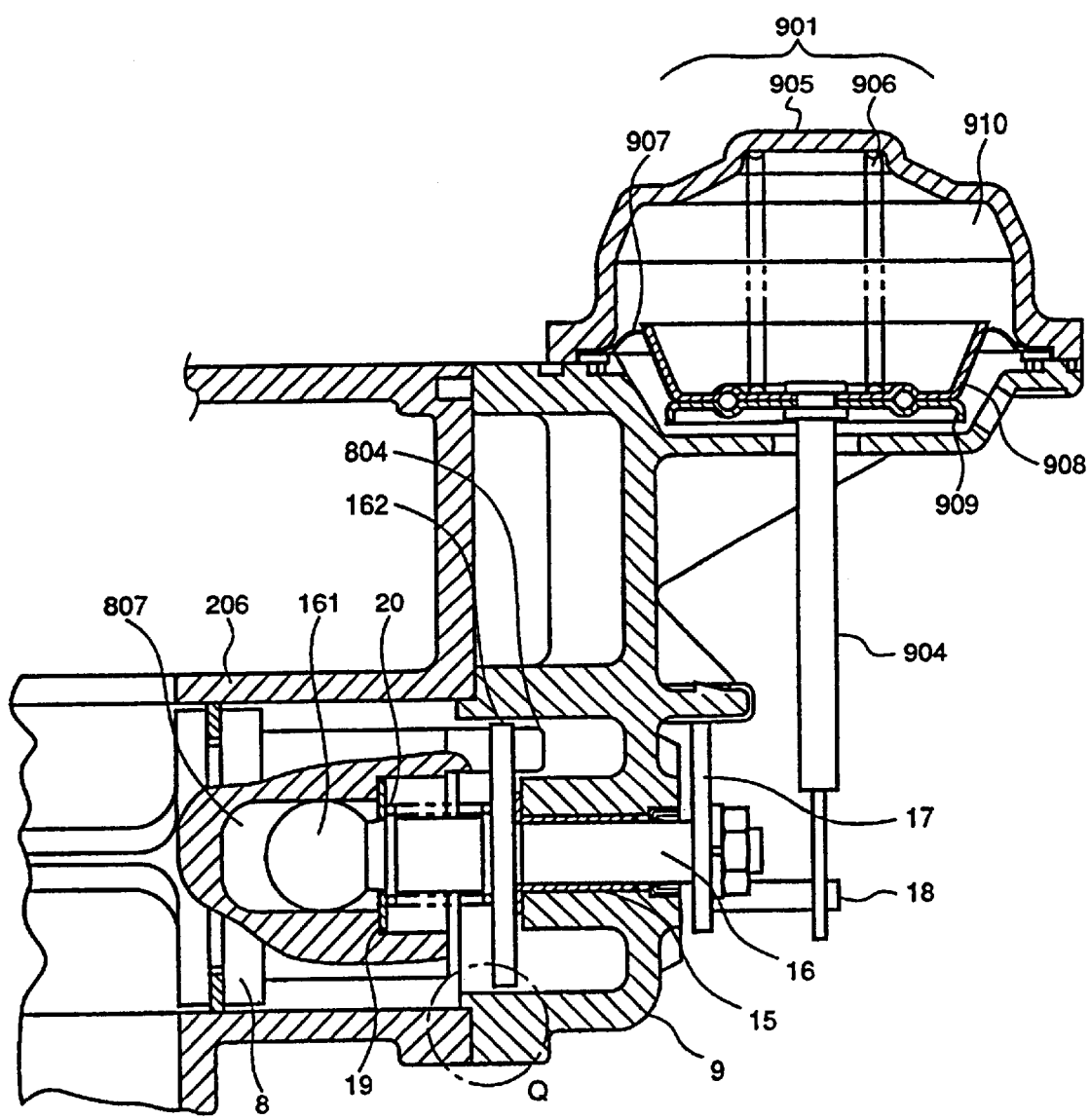
FIG. 11 is a sectional view showing a connection portion of the switching valve 8 and a negative pressure module 9.

Referring next to FIG. 11, the structure of a supporting portion of the switching valve 8. FIG. 11 is a sectional view showing a connection portion of the switching valve 8 and a negative pressure module 9 of the c—c section shown in FIG. 1.

In FIG. 11, the switching valve 8 is inserted into the valve holder 206 integrated with the branch 202, and the negative pressure module 9 is fixed on the end face of the valve holder 206. A hole 807 for engagement is provided at the end portion of the switching valve 8, into which the ball 161 provided at the end portion of the input shaft 16 of the negative pressure module 9.

A flange 162 is provided to the input shaft 16, which contacts a pin 804 so that the pin 804 may move when the flange 162 is rotated.

The input shaft 16 and the switching valve 8 are forced by a spring 20 via a spring bearing 19 in a direction that they get away from each other in an axial direction.

A bearing 15 is provided between the input shaft 16 and the negative pressure module 9, by which the input shaft is supported. A lever 17 and a pin 18 are fixed on the opposite side of the ball 161 of the input shaft 16. They are rotated pivotally around the rotation axis of the input shaft 16 when the input shaft 16 is rotated. The lever 17 has a function of stop the rotation of the input shaft 16 at a predetermined angle.

While, an differential actuator 901 of the negative pressure module 9 comprises a rod 904, a cover 905, a spring 906, a diaphragm 907, a diaphragm bearing 908, and a diaphragm bearing 909. The top end of the rod 904 contacts the pin 18 to actuate it.

When the negative pressure is applied by the electromagnetic valve 902 to a negative pressure chamber 910 of the different actuator 901, the diaphragm 907 in FIG. 11 move upward. By the movement of the diaphragm 907, the rod 904 move upward to actuate the pin 18. Thereby, the input shaft 16 is rotated. Next, the flange 162 of the input shaft 16 is rotated to actuate a pin 804 of the switching valve 8. Thereby, the switching valve 8 is rotated.

Figure 12:
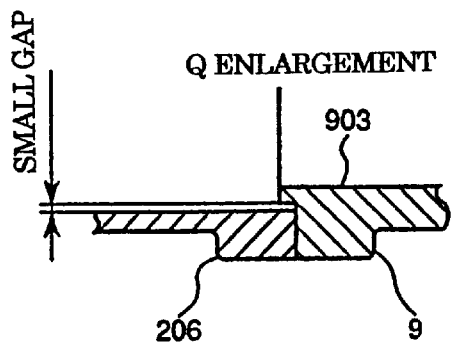
FIG. 12 is a enlarged view of Q part shown in FIG. 11.

FIG. 12 is a enlarged view of Q part shown in FIG. 11.

In order to-improve the coaxial property between the switching valve 8 and the input shaft 16, a cylindrical and projecting portion 903 is provided to the negative pressure module 9. Therefore, the negative pressure module 9 and the valve holder 206 can be engaged with slightly spaced to each other. It is possible to adjust the coaxial property within the range of the small gap.

The structure of the connection portion of the input shaft 16 and the switching valve 8 will be explained next.

Figure 13:
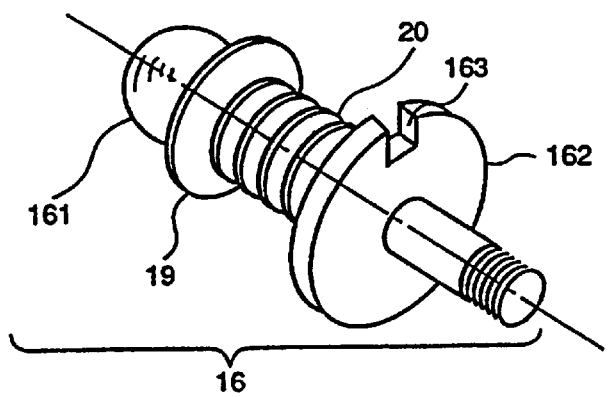
FIG. 13 is a perspective view of an input shaft 16.

FIG. 13 is a perspective view of an input shaft 16. A spring bearing 19 and a spring 20 is mounted movably in an axial direction of the input shaft 16 between the ball 161 and the flange 162. Further, the flange 162 has a notch 163. Both or either one of the ball 161 of the input shaft 16 and the flange 162 is fabricated independently of the input shaft 16, and attached to the input shaft 16.

Figure 14:
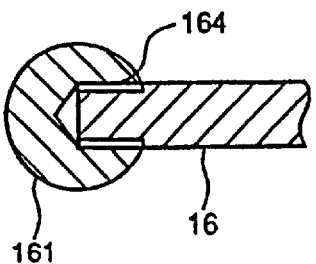
FIG. 14 is a sectional view showing a connection structure of the input shaft 16 and a ball 161.

FIG. 14 is a sectional view showing a connection structure of the input shaft 16 and a ball 161. For example, if the ball 161 is fabricated separately, They are fastened by a screw 164 as shown in FIG. 14. They may be jointed by using welding or press fitting.

Figure 15:
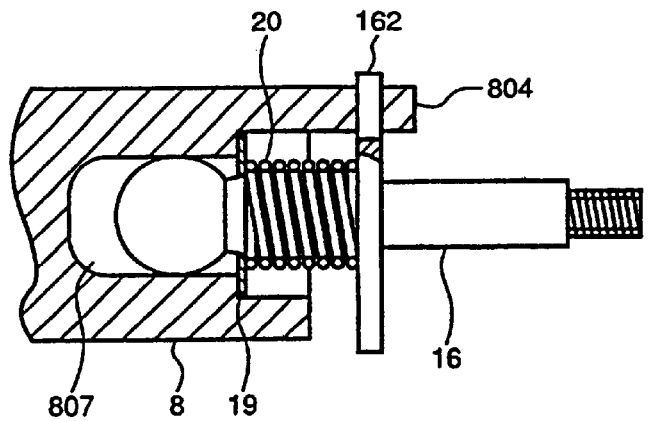
FIG. 15 is a sectional view showing a connection structure of the input shaft 16 and the switching valve 8.

FIG. 15 is a sectional view showing a connection structure of the input shaft 16 and the switching valve 8, and shows a part extracted from the section of FIG. 11.

When the input shaft 16 is inserted into the engagement hole 807 of the switching valve 8, with moving in an axial direction, the pin 804 of the switching valve 8 is aligned to the notch 163 of the flange 162. Thereby, the rotation of the input shaft 16 is transferred to the switching valve 8.

Further, the spring 20 is arranged in an axial direction of the switching valve 8 by forcing the spring bearing 19 to the switching valve 8, and forcing the other end face of the switching valve 8 to the valve holder 206.

By employing the above-mentioned structure, it becomes possible to absorb an error of size in an axial direction and difference in dimension due to thermal deformation by expansion and contraction of the spring 20. Further, the engagement hole 807 and the ball 161 act as a universal joint to absorb the inclination of the axis line of the switching valve 8 and the input shaft 16. According to the present structure, it is possible to absorb the error of dimensions among the switching valve 8, the valve holder 206 and the negative pressure 9. Therefore, the switching valve 8 can be always rotated smoothly.

Figure 16:
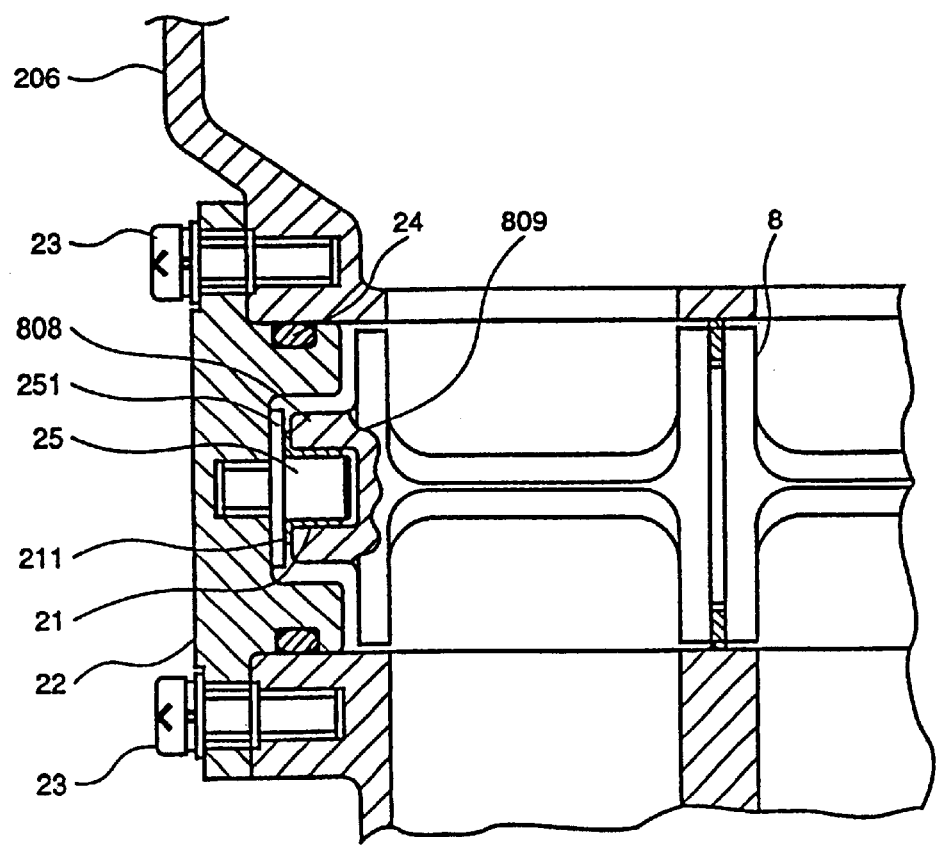
FIG. 16 is a sectional view showing an example of a bearing mechanism of the switching valve.

FIG. 16 is a sectional view showing an example of a bearing mechanism of the switching valve, and shows only a part of the section taken along the line c—c of FIG. 1.

Figure 17:
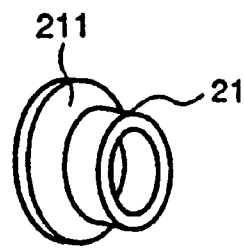
FIG. 17 is a perspective view of a bearing member 21.

A raised portion 808 and an axis hole 809 are provided at the other end of the switching valve 8, and a bearing member 21 is fitted into the axis hole 809. FIG. 17 is a perspective view of a bearing member 21. A cap 22 is screwed to the valve holder 206 by a screw 23. Further, both are sealed fluidly by an O-ring 24. Instead of the O-ring 24, it may be possible to fix the cap 22 to valve holder 206 by press fitting or adhesive bonding.

A metal axis pin 25 is fixed to the cap 22 so as to be inserted pivotally into the bearing member 21. If the cap 22 is molded by using material such as resin other than metal, the axis pin 25 is made of metal to assure the accuracy and the strength of the bearing system. As a method of fixing the axis pin 25 to the cap 22, the axis pin 25 provided with a male screw and the resinous cap 22 are molded in one as shown in the figure. However, it may be possible to fix the axis pin 25 by thermal welding or to screw the axis pin 25 to a nut after the nut with a female screw is molded in one. Further, it may be possible to make integrally the cap 22 and the axis pin of metal.

A flange 211 is provided to the bearing member 21 and a flange 251 is provided to the axis pin 25. Both flanges are contacted each other and receive a force directed to an axial direction generated by the spring 20 described in FIG. 15.

Figure 18:
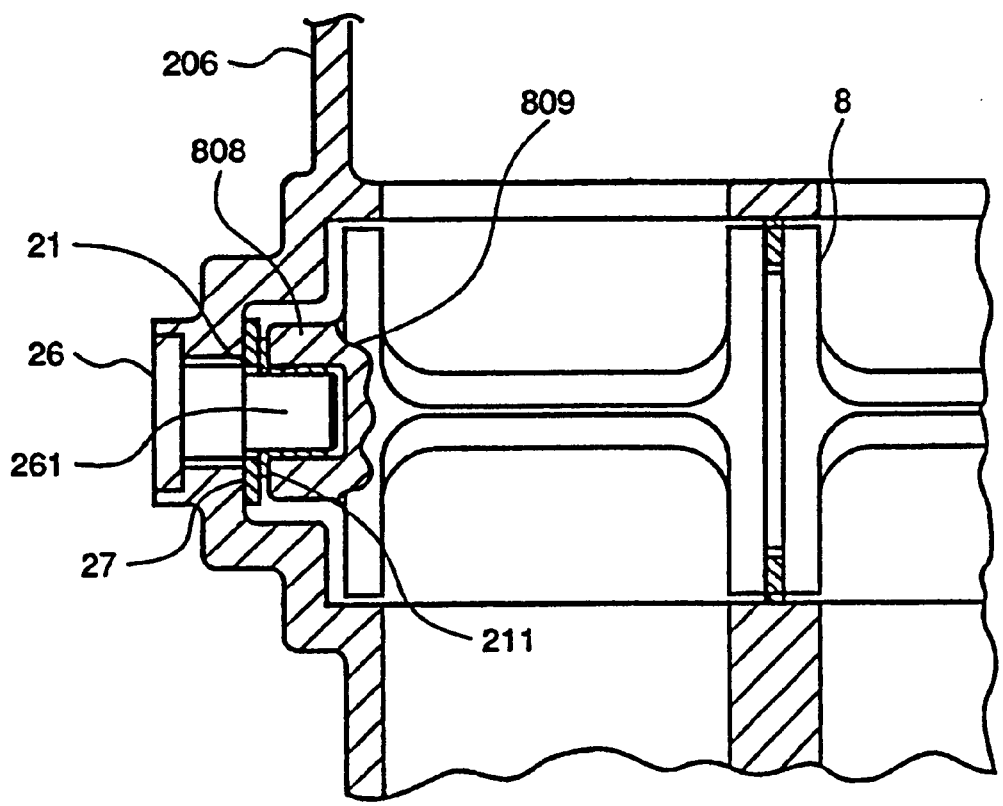
FIG. 18 is a sectional view showing another example of the mechanism similar to one of FIG. 16.

FIG. 18 is a sectional view showing another example of the mechanism similar to one of FIG. 16.

As in the case of FIG. 16, the raised portion 808 and the axis hole 809 are provided at the end of the switching valve 8, and the bearing member 21 shown in FIG. 17 is fitted into the axis hole 809. A bearing pin 26 is fixed at the end face of the valve holder 206 so that the axis pin 261 of the bearing pin 26 and the bearing member 21 may slide pivotally to each other.

Further, a thrust ring 27 is provided between the valve holder 206 and the bearing member 21, which contacts the flange 211 of the bearing member 21. Therefore, the thrust ring 27 receives the force directed to an axial direction generated by the spring 20 shown in FIG. 15.

The material of the bearing pin 26 is metal as in the case of FIG. 16, and the material of the thrust ring 27 is also metal.

Figure 19:
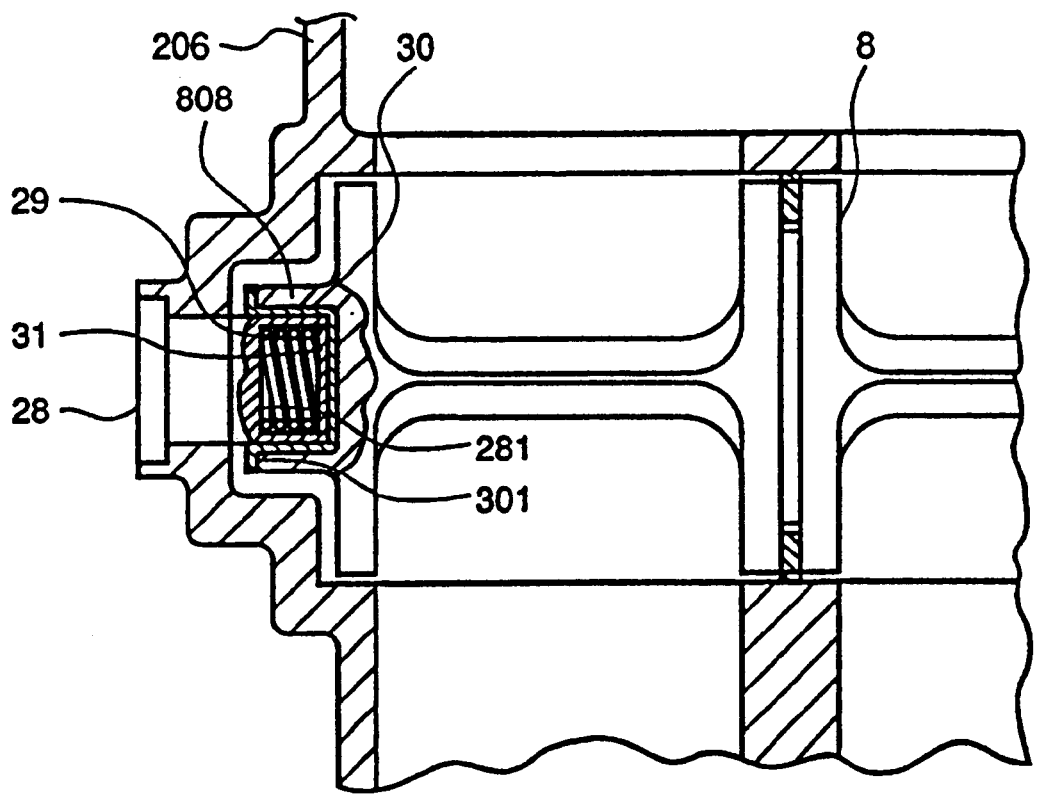
FIG. 19 is a sectional view showing another example of the mechanism similar to one of FIG. 16.

FIG. 19 is a sectional view showing another example of the mechanism similar to one of FIG. 16.

As in the case of FIG. 16, a bearing member 30 is fitted to the end portion of the switching valve 8. However, the bearing member 30 is different from the bearing member 21 shown in FIG. 17. There is no hole in the bearing member 30.

Figure 20:
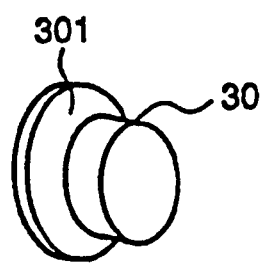
FIG. 20 is a perspective view of a bearing member 30.

FIG. 20 is a perspective view of a bearing member 30.

A bearing pin 28 fixed at the end face of the valve holder 206 and the bearing member 30 slide pivotally to each other. A spring 29 is provided inside of the bearing pin 28. One end of the spring 29 contacts a thrust block face 281 provided at the end face of the bearing pin 28, and the other end contacts one face of a spring bearing 31. The other face of the spring bearing 31 contacts the bearing member 30 fixed to the switching valve 8 and slides. The spring 29 forces the switching valve 8 to an axial direction via the spring bearing 31 and the bearing member 30. The material of the bearing pin 28, the spring bearing 31 and the bearing member 30 are metal. A method of fixing the bearing pin 28 to the valve holder 206 is the same as one described in FIG. 18

Because in this example the spring 29 produces the fixed force directed to an axial direction of the switching valve 8, it is possible to eliminate the spring 20 shown in FIG. 13 to FIG. 15. In this case, it is required to fix the switching valve 8 to the input shaft 16 so that the switching valve 8 does not pull out of the valve holder 206.

Figure 21:
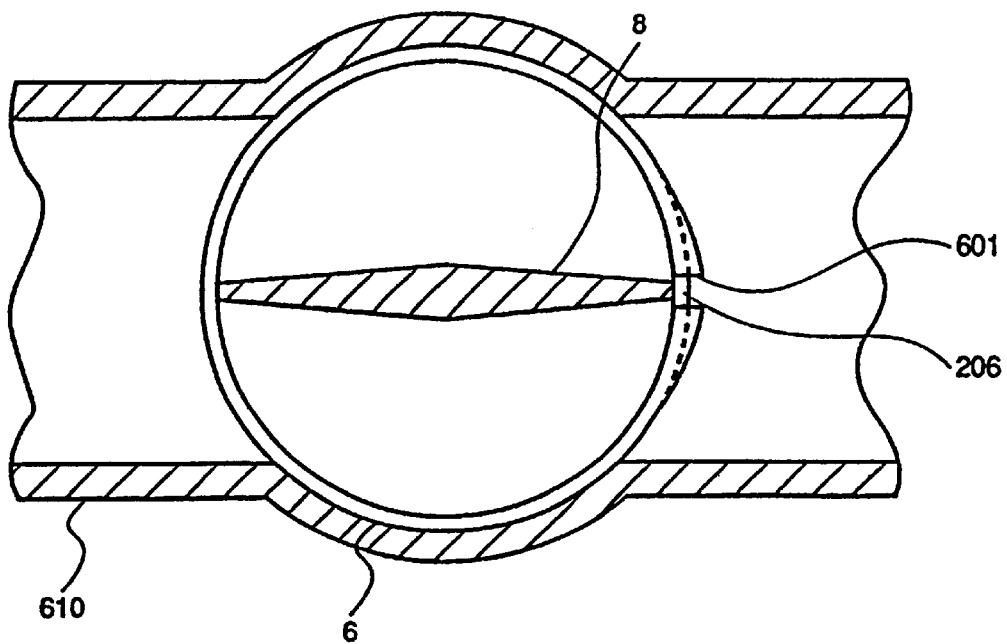
FIG. 21 is a sectional view taken along a line d—d of FIG. 3 as in FIG. 4.
Figure 22:
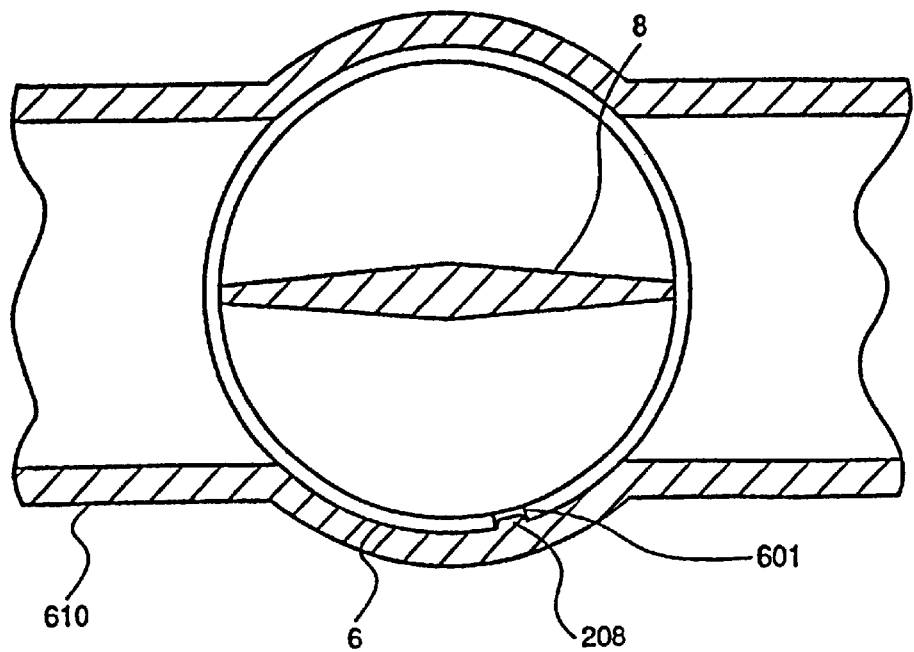
FIG. 22 is a sectional view taken along a line d—d of FIG. 3 as in FIG. 4.

FIGS. 21 and 22 each is a sectional views taken along a line d—d of FIG. 3 as in FIG. 4.

In FIG. 4, the position of the divided portion 601 of the seal ring 6 has been explained. In the case that the sub-branch 610 and the valve holder 206 is made of the material with high strength, and the switching valve 8 is made of the elastic material susceptible to the change in form due to the external force, there is a fear that the divided portion 601 of the seal ring 6 may be failed in the case of the position shown in FIG. 4. If in FIG. 21 each expands due to heat under the atmosphere of high temperature, major change in the dimension of the switching valve 8 occurs in a direction perpendicular to the drawing sheet. As a result, a part of the seal ring 6 projects to the air intake passage, so that the outer diameter of the divided portion 601 of the seal ring 6 becomes larger than the valve holder 206. As the temperature of the atmosphere is decreased, the dimension is recovered. However, the projected portion of the divided portion of the seal ring 6 gets stuck on the wall of the air intake passage, and therefor, the valve holder 206 can not return. In the case that such change in dimension is predicted, the position of the divided portion of the seal ring 6 should be arranged at the wall other than the air intake passage. For example, in FIG. 22, a projecting guide 208 is provided on the wall surface of the circumference of a hole holder 206 in a direction perpendicular to the face of a sheet to guide the divided portion 601. Therefore, the divided portion 601 can not rotate in a direction from the wall to the air intake passage. Because the guide 208 is made so as to block up the divided portion 601, it is possible to decrease the leakage of the intake air between air intake passages.

As described above, the present invention employs a structure in which an input shaft which is a member for connecting a cylindrical switching valve and a rotary mechanism, and the cylindrical switching valve are brought into contact with each other via a ball-like member. By using this structure, the ball-like member serves as a kind of ball joint, so that rotation can be smoothly transmitted even when there is an angle of inclination between the direction of the axis of rotation of the input shaft by which the rotary mechanism for rotating the cylindrical switching valve and the cylindrical switching valve are connected, and the direction of the axis of rotation of this switching valve.

Further, because the seal ring is provided to the switching valve and the divided portion of the seal ring is provided on the wall of the valve holder into which the switching valve is inserted, it is possible to solve the problem that the seal ring may not replace when the thermal expansion or shrinkage of the material is occurred.

Further, because the above-mentioned components and parts are assembled integrally and then fixed to the internal combustion engine as is, it is easy to assemble as compared with the case that they are assembled to the internal combustion engine one by one. Therefore, the assembly time can be shorten.

What is claimed is:

1. An air intake apparatus comprising a collector connected commonly to a plurality of branches of intake pipes for supplying intake air to an internal combustion engine, an air chamber, a plurality of sub-branches of an air intake passage repectively, connected fluidly between said intake pipes and the air chamber, said branches and sub-branches being equal in number, and a cylindrical switching valve arranged within a cylindrically-shaped valve holder to block the flow in the air intake passage, wherein said cylindrical valve holder is arraned to intersect the associated said intake passage at a location of intersection of the latter with said air chamber, wherein an opening of said air chamber is provided only to said air intake passage, said air chamber being parallel to said collector and, together with said valve holder, arranged to intersect said plurality of branches, wherein said drive unit for driving the switching valve is connected to said switching valve, and wherein said plurality of branches of intake, said plurality of sub-branches of intake passages, and said cylindrically-shaped valve holder are integrally molded.

2. An air intake apparatus according to claim 1, wherein a fuel supplying unit for supplying fuel to the internal combustion engine is provided to said intake pipe, and wherein said intake pipe, said air chamber, said air intake passage, said switching valve, said drive unit, and said fuel supplying unit are assembled integrally in the internal combustion engine.

* * * * *